(12) United States Patent
Morgan et al.

(10) Patent No.: US 9,667,451 B2
(45) Date of Patent: *May 30, 2017

(54) SYSTEM FOR TRANSMITTING INFORMATION BETWEEN CIRCUITS

(71) Applicant: Texas Instruments Incorporated, Dallas, TX (US)

(72) Inventors: Mark W. Morgan, Allen, TX (US); Rajarshi Mukhopadhyay, Allen, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/195,687

(22) Filed: Jun. 28, 2016

(65) Prior Publication Data

US 2016/0308691 A1    Oct. 20, 2016

Related U.S. Application Data

(63) Continuation of application No. 14/479,966, filed on Sep. 8, 2014, now Pat. No. 9,379,774.

(60) Provisional application No. 61/876,986, filed on Sep. 12, 2013.

(51) Int. Cl.
| | |
|---|---|
| *H03B 1/00* | (2006.01) |
| *H03K 3/00* | (2006.01) |
| *H04L 25/02* | (2006.01) |
| *H04B 3/54* | (2006.01) |
| *H04B 3/56* | (2006.01) |

(52) U.S. Cl.
CPC .......... *H04L 25/0272* (2013.01); *H04B 3/54* (2013.01); *H04B 3/56* (2013.01); *H04B 2203/5425* (2013.01); *H04B 2203/5491* (2013.01)

(58) Field of Classification Search
CPC ........................... H03H 7/004; H03H 7/0138
USPC ....... 327/108–112; 326/21, 82, 83; 333/24 C
See application file for complete search history.

(56) References Cited

U.S. PATENT DOCUMENTS

| | | | |
|---|---|---|---|
| 2010/0141304 A1* | 6/2010 | Miyazaki | H02M 1/08 327/109 |
| 2012/0161841 A1* | 6/2012 | Dong | H03K 3/3565 327/206 |

* cited by examiner

*Primary Examiner* — Lincoln Donovan
*Assistant Examiner* — Thomas Skibinski
(74) *Attorney, Agent, or Firm* — Michael A. Davis, Jr.; Charles A. Brill; Frank D. Cimino

(57) ABSTRACT

In described examples, a first isolation element electrically isolates a first circuit from a second circuit and passes AC signals between the first circuit and the second circuit. A second isolation element electrically isolates the first circuit from the second circuit and passes AC signals between the first circuit and the second circuit. A ground of the second circuit electrically floats relative to a ground of the first circuit, so that a digital signal is able to pass from the second circuit through a third isolation element to the first circuit. A supply voltage generation device converts AC signals from the first isolation element and the second isolation element into at least one DC voltage to power the second circuit.

22 Claims, 2 Drawing Sheets

SYSTEM FOR TRANSMITTING INFORMATION BETWEEN CIRCUITS

CROSS-REFERENCE TO RELATED APPLICATION

This application is a continuation of U.S. patent application Ser. No. 14/479,966 filed Sep. 8, 2014, which claims priority to U.S. Provisional Patent Application Ser. No. 61/876,986 filed Sep. 12, 2013, naming Mark Morgan, et al. as inventors. All of the above-identified applications are hereby fully incorporated herein by reference for all purposes.

BACKGROUND

Some processing circuits use information from sensors to measure parameters, such as temperature. These processing circuits typically operate at relatively low voltages, such as 3.3 volts or 5.0 volts, but some of the sensors can operate at much higher voltages. Also, some circuits that drive the sensors and/or process information therefrom can operate at the higher voltages.

In electronic communication of information between a high voltage circuit and a low voltage circuit, the circuits may be exposed to transients and other anomalies, which can disrupt and/or corrupt the information transfer between the circuits.

SUMMARY

In described examples, a first isolation element electrically isolates a first circuit from a second circuit and passes AC signals between the first circuit and the second circuit. A second isolation element electrically isolates the first circuit from the second circuit and passes AC signals between the first circuit and the second circuit. A ground of the second circuit electrically floats relative to a ground of the first circuit, so that a digital signal is able to pass from the second circuit through a third isolation element to the first circuit. A supply voltage generation device converts AC signals from the first isolation element and the second isolation element into at least one DC voltage to power the second circuit.

DETAILED DESCRIPTION

Figure 1:
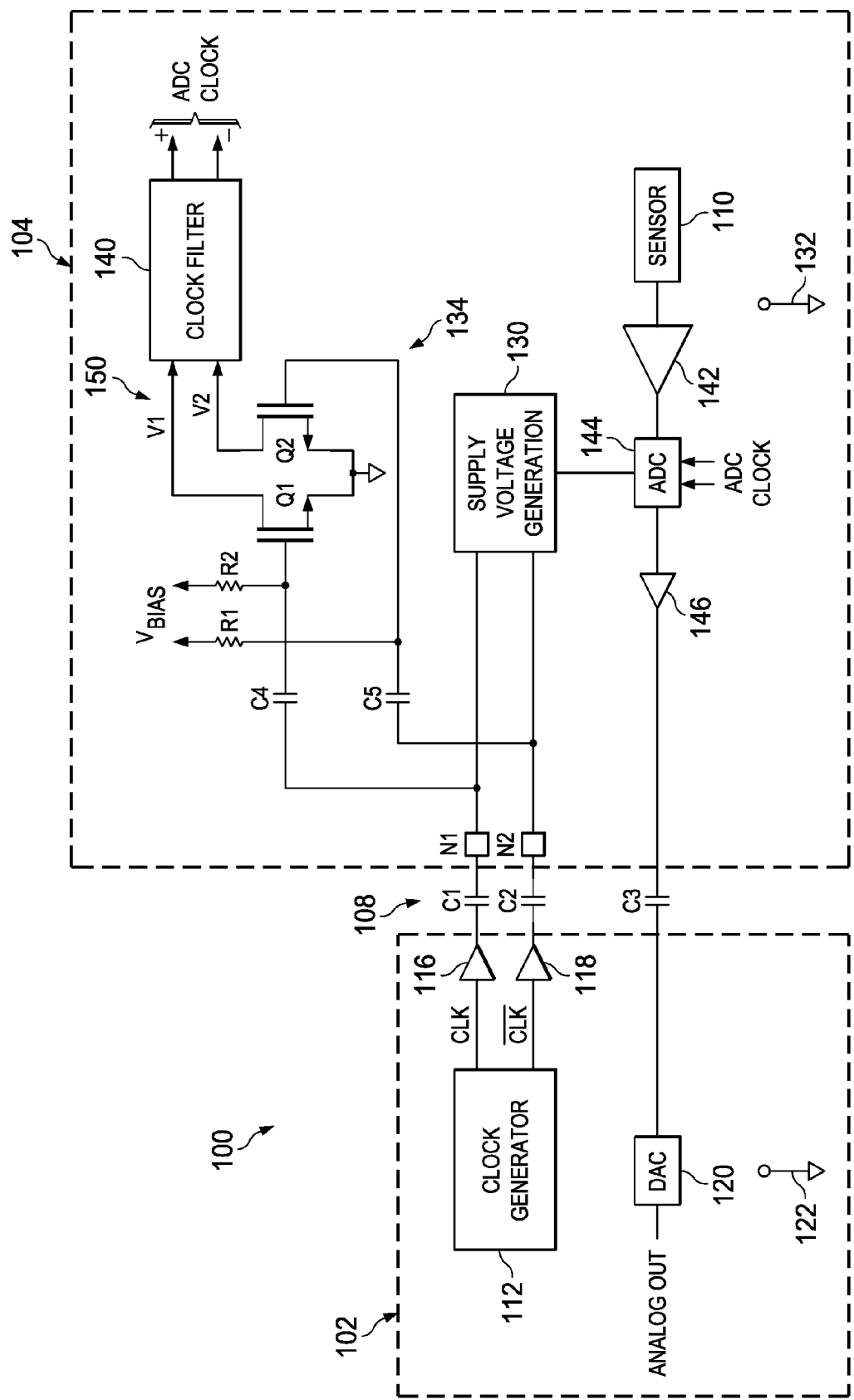
FIG. 1 is a block diagram of circuitry for transferring information and power between a low voltage circuit and a high voltage circuit of the illustrative embodiments.

FIG. 1 is a block diagram of a system (including circuitry) 100 for transferring information (e.g., data) and power between a first circuit 102 and a second circuit 104. In this example, the first circuit 102 operates as a low voltage circuit at relatively low voltages (such as 3.3 or 5.0 volts in some embodiments). The second circuit 104 operates as a high voltage circuit at relatively high voltages (such as 1 kV in some embodiments). Isolation elements 108 electrically isolate the first circuit 102 from the second circuit 104. In the embodiment of FIG. 1, the isolation elements 108 are capacitors C1, C2 and C3.

As shown in FIG. 1, the system 100 includes circuitry to operate a sensor 110 and to output information generated by the sensor 110. In this example, the sensor 110 operates at relatively high voltages, which are high enough to possibly damage circuitry in the first circuit 102. In the embodiment of FIG. 1, the sensor 110 generates analog signals or voltages indicative of the parameter being sensed or measured. Information generated by the sensor 110 is transferred from the second circuit 104 to the first circuit 102. Also, for processing the information generated by the sensor 110, the first circuit 102 transfers timing (e.g., clock) signals to the second circuit 104.

Figure 2A:
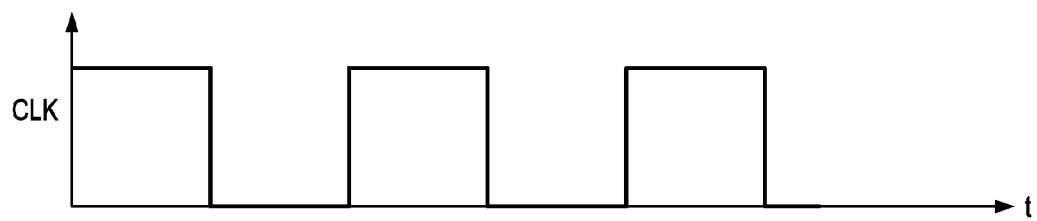
FIG. 2A is an example timing diagram of a clock signal CLK generated by the clock generator of FIG. 1.
Figure 2B:
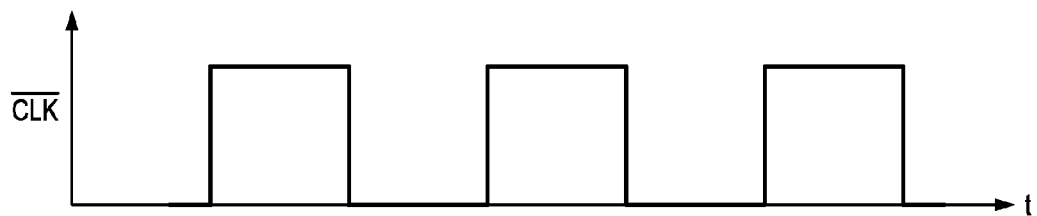
FIG. 2B is an example timing diagram of a clock signal CLK generated by the clock generator of FIG. 1.

The first circuit 102 includes a clock generator 112 that generates differential clock signals CLK and $\overline{CLK}$. FIGS. 2A and 2B are example timing diagrams of clock signals CLK and $\overline{CLK}$ generated by the clock generator 112. As shown in FIGS. 2A and 2B, the clock signal CLK is a complement (e.g., opposite) of the clock signal $\overline{CLK}$. In ideal conditions, the edges of the clock signals CLK and $\overline{CLK}$ are vertical, indicating that they rise and fall in zero time. Also, one clock signal rises at the same time that the other clock signal falls and vise versa. The clock signals CLK and $\overline{CLK}$ are output to (and received by) drivers 116 and 118, which increase the power of the clock signals CLK and $\overline{CLK}$ for transmission through the isolation elements 108 and to the second circuit 104. In some embodiments, the drivers 116 and 118 are incorporated into the clock generator 112 and are not discrete components as shown in FIG. 1. In other embodiments, the clock signals CLK and $\overline{CLK}$ are not amplified by drivers, because the clock generator 112 generates signals that are strong enough without amplification. The first circuit 102 includes a digital to analog converter (DAC) 120 that converts digital signals generated by the second circuit 104 to analog signals. In some embodiments, the DAC 120 performs its digital to analog conversions in response to timing of the clock signals CLK and/or $\overline{CLK}$.

The devices in the first circuit 102 operate with voltages referenced to a first ground 122. For example, the clock signals CLK and $\overline{CLK}$ are referenced to the first ground 122. In some embodiments, the first ground 122 is representative of a ground plane proximate many of the devices in the first circuit 102. As described in greater detail below, the system 100 maintains the integrity of the clock signals CLK and $\overline{CLK}$ between the first circuit 102 and the second circuit 104, even when the system 100 is subjected to a transient. For example, the clock signals CLK and $\overline{CLK}$ between the first circuit 102 and the second circuit 104 are not disrupted in response to a transient on the first ground 122.

In the example of FIG. 1, the clock signals CLK and $\overline{CLK}$ are relatively low voltage signals (such as 3.3 or 5.0 volts in some embodiments) as referenced to the first ground 122. Timing of the second circuit 104 is responsive to the clock signals CLK and $\overline{CLK}$. The first circuit 102 and the second circuit 104 operate at different voltages, so the isolation elements 108 isolate the second circuit 104 and the first circuit 102. For the clock signals CLK and $\overline{CLK}$ in the embodiment of FIG. 1, the isolation elements 108 are capacitors C1 and C2. The capacitors C1 and C2 pass AC signals, so the clock signals CLK and $\overline{CLK}$ pass through the capacitors C1 and C2. The isolation elements 108 prevent DC voltages and some transients on the second circuit 104 from interfering with devices operating on the first circuit 102 and vice versa.

The clock signals CLK and $\overline{CLK}$ are output to (and received by) the first circuit 104 at nodes N1 and N2, respectively. The nodes N1 and N2 are coupled (e.g. connected) to a supply voltage generation device 130 and other devices. The generation device 130 converts the AC clock signals CLK and $\overline{CLK}$ to at least one DC operating voltage to power the devices in the second circuit 104. The devices and signals in the second circuit 104 operate in reference to a second ground 132, which is isolated (e.g., separate) from the first ground 122 on the first circuit 102. In the embodiment of FIG. 1, the second ground 132 electrically floats relative to the first ground 122.

In the embodiment of FIG. 1, the other devices in the second circuit 104 include clock regeneration circuitry 134, a clock filter 140, an amplifier 142, an analog to digital converter (ADC) 144, a driver 146, and the sensor 110, which in some embodiments is coupled to the second circuit 104. The clock regeneration circuitry 134 regenerates the clock signals CLK and $\overline{CLK}$ in the second circuit 104 after they have passed through the isolation elements 108. The ADC 142 converts analog signals generated by the sensor 110 into digital signals. The amplifier 142 amplifies the signals generated by the sensor 110. The driver 146 amplifies the digital signals generated by the ADC 144.

In the embodiment of FIG. 1, the system 100 is coupled to the sensor 110. The sensor 110 measures a parameter, such as temperature, and outputs an analog signal representative of the value of that parameter. The amplifier 142 amplifies the analog signal generated by the sensor 110. In some embodiments, the amplifier 142 is a low noise amplifier. The amplifier 142 outputs the analog signal to the ADC 144, which converts the analog signal to a digital signal in response to clock signals generated by the clock regeneration circuitry 134. The ADC 144 outputs the digital signal to the driver 146, which amplifies the digital signal and transmits it to the first circuit 102. In the example of FIG. 1, the digital signal passes through the capacitor C3 of the isolation elements 108, because the first ground 122 floats relative to the second ground 132.

In the system 100, the clock signals CLK and $\overline{CLK}$ drive devices in the second circuit 104, while substantially preserving the common-mode transient immunity (CMTI) between the first circuit 102 and the second circuit 104. The CMTI parameter is a measure of effects that a transient on one side of the isolation elements 108 has on the other side. In an example of testing the CMTI, a high voltage/high speed transient is introduced on one of the grounds 122 or 132, and errors are detected in the information transfer between the two circuits 102 and 104. In some examples, the clock signals CLK and $\overline{CLK}$ are fixed at high or low states, and high voltage transients (such as one commencing at a rising rate of 50 kV/µs) are induced on a ground 122 or 132. The CMTI is a measure of rate and magnitude that the transient can achieve before causing errors in the information.

The clock signals CLK and $\overline{CLK}$ are output to (and received by) the second circuit 104 at nodes N1 and N2, respectively. The node N1 is coupled to a capacitor C4 that filters transients and passes the CLK signal. The node N2 is coupled to a capacitor C5 that filters transients and passes the $\overline{CLK}$ signal. In other embodiments, the system 100 performs different types of filtering to filter transients and pass the clock signals CLK and $\overline{CLK}$.

The capacitors C4 and C5 are coupled to a buffer 150 that provides high impedance buffering between the capacitors C4 and C5 and the clock filter 140. In the embodiment of FIG. 1, the buffer 150 includes two field effect transistors (FETs) Q1 and Q2. The capacitors C4 and C5 are coupled to the gates of the FETs Q1 and Q2. The drains of the FETs Q1 and Q2 are the outputs of the buffer 150 and are coupled to the clock filter 140. The voltages at the drains of the FETs Q1 and Q2 are voltages V1 and V2, respectively.

The regeneration circuitry 134 of FIG. 1 includes bias circuitry having two resistors, a resistor R1 and a resistor R2, which are coupled between a bias voltage $V_{BIAS}$ and the gates of the FETs Q1 and Q2. The bias circuitry maintains the FETs Q1 and Q2 in a conducting (on) state unless the voltage on either gate becomes low. More specifically, capacitors C4 and C5 do not conduct DC, and the current drawn into the gates of the FETs Q1 and Q2 is very small, so the DC voltage on the gates is approximately the forward bias voltage of the FETS Q1 and Q2 when the clock signals CLK and $\overline{CLK}$ are high. When a clock signal CLK or $\overline{CLK}$ transitions to a low state, the AC component of the clock signal forces the gate voltage of the corresponding FET to drop, which causes the FET to turn off. The corresponding voltage V1 or V2 will then rise. The bias circuitry sets the voltage level that causes the voltages V1 and V2 to rise.

The capacitors C4 and C5 form high pass filters in conjunction with the resistors R1 and R2 and the other impedances associated with the gates of the FETs Q1 and Q2. By selecting capacitors C4 and C5 having small capacitance values, the filtering provided by the capacitors C4 and C5 has higher frequencies than a transient, but stays within the bandwidth of the clock signals CLK and $\overline{CLK}$. Accordingly, transients are attenuated, the clock signals CLK and $\overline{CLK}$ are passed, and CMTI is improved relative to conventional circuitry for transmitting information.

The clock filter 140 processes the voltages V1 and V2, so that they are suitable for the ADC 144 operations to convert the analog signals generated by the sensor 110 into digital signals. The voltages V1 and V2 are similar to the clock signals CLK and $\overline{CLK}$ of FIGS. 2A and 2B. When the clock signals CLK and $\overline{CLK}$ pass through the regeneration circuitry 134, some harmonics are lost, which may distort the signals. The clock filter 140 performs filtering on the voltages V1 and V2 to correct for harmonics and other components that may have been filtered or noise that may have been added to the voltages V1 and V2. The clock filter 140 outputs voltages that are received by the ADC 144. In other embodiments, the clock filter 140 removes jitter from the voltages V1 and V2. In other embodiments, the clock filter 140 performs $f/(2^N)$ filtering.

In the embodiment of FIG. 1, the bandwidth of the transient has lower frequencies than the bandwidth of the clock signals CLK and $\overline{CLK}$, so the system 100 performs high pass filtering to attenuate the transients and pass the clock signals CLK and $\overline{CLK}$. In other embodiments, the system 100 has different clock signals and/or performs different modulation techniques to further increase the bandwidth of the clock signals CLK and $\overline{CLK}$. Instead of the capacitors C4 and C5, some embodiments have band-pass filters whose pass bands are centered on the frequency of the clock signals CLK and $\overline{CLK}$. The band-pass filters attenuate all frequencies other than the clock frequencies. Accordingly, the transients have a high probability of being attenuated.

In some embodiments, the pass bands of the band-pass filters are well outside the bandwidth of known transients. For example, the pass band may be higher or lower than the frequency bands of the known transients. In these embodiments, it is likely that the transients will not be in the pass band and will be attenuated.

Modifications are possible in the described embodiments, and other embodiments are possible, within the scope of the claims.

What is claimed is:

1. A system, comprising:
a first isolation element to electrically isolate a first circuit from a second circuit and to pass AC signals between the first circuit and the second circuit;
a second isolation element to electrically isolate the first circuit from the second circuit and to pass AC signals between the first circuit and the second circuit;
a ground of the second circuit to electrically float relative to a ground of the first circuit, so that a digital signal is able to pass from the second circuit through a third isolation element to the first circuit; and
a supply voltage generation device to convert AC signals from the first isolation element and the second isolation element into at least one DC voltage to power the second circuit.

2. The system of claim 1, wherein AC signals passed through the first isolation element and the second isolation element together form a differential signal.

3. The system of claim 1, wherein: AC signals of the first circuit are referenced to the ground of the first circuit; and AC signals of the second circuit are referenced to the ground of the second circuit.

4. The system of claim 1, further comprising:
a first transient filter to pass AC signals from the first isolation element and to attenuate at least one frequency of a transient;
a second transient filter to pass AC signals from the second isolation element and to attenuate at least one frequency of a transient; and
a buffer to isolate a clock filter from the first and second transient filters.

5. The system of claim 4, wherein the clock filter is for generating at least one clock signal from signals that pass through the buffer from the first and second transient filters.

6. The system of claim 4, wherein the clock filter performs $f/(2^N)$ filtering.

7. The system of claim 4, wherein the buffer includes:
a first transistor to buffer signals passing through the first transient filter, wherein a gate of the first transistor is coupled to the first transient filter; and
a second transistor to buffer signals passing through the second transient filter, wherein a gate of the second transistor is coupled to the second transient filter.

8. The system of claim 7, wherein the buffer is for passing signals that are greater than a predetermined voltage.

9. The system of claim 4, further comprising: a first resistor coupled between the first transient filter and a predetermined voltage; and a second resistor coupled between the second transient filter and the predetermined voltage.

10. The system of claim 4, wherein: the first transient filter includes a first capacitor coupled to the first isolation element; and the second transient filter includes a second capacitor coupled to the second isolation element.

11. The system of claim 4, wherein the first transient filter is a high pass filter to pass AC signals from the first isolation element and to attenuate the at least one frequency of the transient, wherein the at least one frequency of the transient is lower than a frequency of AC signals from the first isolation element.

12. The system of claim 4, wherein the second transient filter is a high pass filter to pass AC signals from the second isolation element and to attenuate the at least one frequency of the transient, wherein the at least one frequency of the transient is lower than a frequency of AC signals from the second isolation element.

13. The system of claim 4, wherein the first transient filter is a band pass filter to pass AC signals from the first isolation element and to attenuate the at least one frequency of the transient, wherein the at least one frequency of the transient is outside a bandwidth passed by the band pass filter.

14. The system of claim 4, wherein the second transient filter is a band pass filter to pass AC signals from the second isolation element and to attenuate the at least one frequency of the transient, wherein the at least one frequency of the transient is outside a bandwidth passed by the band pass filter.

15. A system, comprising:
a first isolation element to electrically isolate a first circuit from a second circuit and to pass AC signals between the first circuit and the second circuit;
a second isolation element to electrically isolate the first circuit from the second circuit and to pass AC signals between the first circuit and the second circuit;
a ground of the second circuit to electrically float relative to a ground of the first circuit, so that a digital signal is able to pass from the second circuit through a third isolation element to the first circuit;
a supply voltage generation device to convert AC signals from the first isolation element and the second isolation element into at least one DC voltage to power the second circuit;
a first transient filter to pass AC signals from the first isolation element and to attenuate at least one frequency of a transient;
a second transient filter to pass AC signals from the second isolation element and to attenuate at least one frequency of a transient; and
a buffer to isolate a clock filter from the first and second transient filters.
wherein: AC signals passed through the first isolation element and the second isolation element together form a differential signal; AC signals of the first circuit are referenced to the ground of the first circuit; AC signals of the second circuit are referenced to the ground of the second circuit; and the clock filter is for generating at least one clock signal from signals that pass through the buffer from the first and second transient filters.

16. The system of claim 15, wherein the clock filter performs $f/(2^N)$ filtering.

17. The system of claim 15, wherein the buffer includes:
a first transistor to buffer signals passing through the first transient filter, wherein a gate of the first transistor is coupled to the first transient filter; and
a second transistor to buffer signals passing through the second transient filter, wherein a gate of the second transistor is coupled to the second transient filter.

18. The system of claim 17, wherein the buffer is for passing signals that are greater than a predetermined voltage.

19. The system of claim 15, further comprising: a first resistor coupled between the first transient filter and a predetermined voltage; and a second resistor coupled between the second transient filter and the predetermined voltage.

20. The system of claim 15, wherein: the first transient filter includes a first capacitor coupled to the first isolation element; and the second transient filter includes a second capacitor coupled to the second isolation element.

21. The system of claim 15, wherein: the first transient filter is a first high pass filter to pass AC signals from the first isolation element and to attenuate the at least one frequency of the transient; the second transient filter is a second high pass filter to pass AC signals from the second isolation element and to attenuate the at least one frequency of the transient; and the at least one frequency of the transient is lower than a frequency of AC signals from the first and second isolation elements.

22. The system of claim 15, wherein: the first transient filter is a first band pass filter to pass AC signals from the first isolation element and to attenuate the at least one frequency of the transient; the second transient filter is a second band pass filter to pass AC signals from the second isolation element and to attenuate the at least one frequency of the transient; and the at least one frequency of the transient is outside a bandwidth passed by the first and second band pass filters.

* * * * *